United States Patent
Reddy

(10) Patent No.: US 12,382,237 B2
(45) Date of Patent: Aug. 5, 2025

(54) METHOD TO ADAPT AUDIO PROCESSING BASED ON USER ATTENTION SENSING AND SYSTEM THEREFOR

(71) Applicant: DELL PRODUCTS, LP, Round Rock, TX (US)

(72) Inventor: Karun Palicherla Reddy, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 116 days.

(21) Appl. No.: 17/026,406

(22) Filed: Sep. 21, 2020

(65) Prior Publication Data

US 2022/0095074 A1  Mar. 24, 2022

(51) Int. Cl.
H04S 7/00 (2006.01)
G06T 7/70 (2017.01)

(52) U.S. Cl.
CPC ............... *H04S 7/303* (2013.01); *G06T 7/70* (2017.01); *G06T 2207/30201* (2013.01)

(58) Field of Classification Search
None
See application file for complete search history.

(56) References Cited

U.S. PATENT DOCUMENTS

| | | | |
|---|---|---|---|
| 5,477,270 A | 12/1995 | Park | |
| 8,913,004 B1* | 12/2014 | Bozarth | G06F 1/3234 348/78 |
| 9,704,216 B1* | 7/2017 | Laskar | G06F 3/012 |
| 9,747,068 B2 | 8/2017 | Laaksonen et al. | |
| 9,986,151 B1* | 5/2018 | Poon | G06V 10/60 |
| 10,148,241 B1* | 12/2018 | Peeler | H03G 3/32 |
| 2010/0060722 A1* | 3/2010 | Bell | G06T 13/40 348/E13.001 |
| 2012/0114139 A1* | 5/2012 | Pan | H03H 21/0012 381/94.1 |
| 2013/0028443 A1* | 1/2013 | Pance | H04N 21/4223 381/107 |
| 2014/0176813 A1* | 6/2014 | Conness | H04N 21/42204 348/738 |
| 2014/0354791 A1* | 12/2014 | Lee | G06F 3/165 348/739 |
| 2014/0375752 A1* | 12/2014 | Shoemake | G06V 40/10 348/14.07 |
| 2017/0289683 A1* | 10/2017 | Eichfeld | H04R 3/12 |
| 2017/0374486 A1* | 12/2017 | Killham | H04R 5/02 |
| 2018/0329672 A1* | 11/2018 | Sadak | G06F 1/1649 |
| 2020/0267493 A1* | 8/2020 | Mouncer | H04S 7/303 |
| 2020/0373810 A1* | 11/2020 | Channaiah | G05B 19/042 |

* cited by examiner

*Primary Examiner* — Duc Nguyen
*Assistant Examiner* — Assad Mohammed
(74) *Attorney, Agent, or Firm* — Larson Newman, LLP

(57) ABSTRACT

A method may include capturing an image at a camera included at an information handling system, the camera coupled to a vision system. A position of a user relative to a display device may be determined based on analysis of the image by the vision system. The method may further include adjusting properties of an audio signal provided to a speaker based on the position of the user.

17 Claims, 5 Drawing Sheets

METHOD TO ADAPT AUDIO PROCESSING BASED ON USER ATTENTION SENSING AND SYSTEM THEREFOR

FIELD OF THE DISCLOSURE

This disclosure generally relates to information handling systems, and more particularly relates to adapting audio processing based on user attention sensing.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

A method may include capturing an image at a camera included at an information handling system, the camera coupled to a vision system. A position of a user relative to a display device may be determined based on analysis of the image by the vision system. The method may further include adjusting properties of an audio signal provided to a speaker based on the position of the user.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
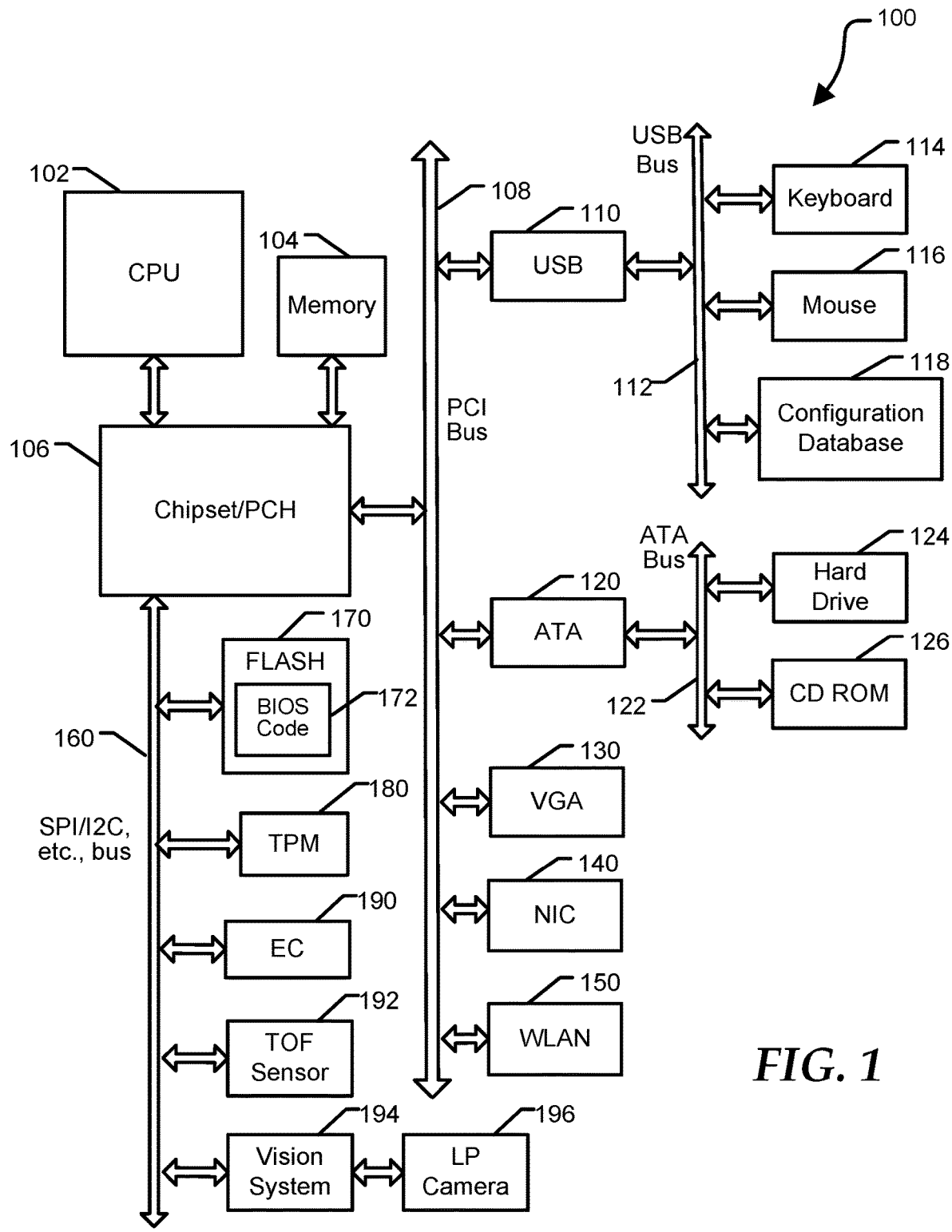
FIG. 1 is a block diagram of an information handling system according to a specific embodiment of the present disclosure.

FIG. 1 illustrates an information handling system 100 including a processor 102, a memory 104, a chipset 106, a PCI bus 108, a universal serial bus (USB) controller 110, a USB 112, a keyboard device 114, a mouse device controller 116, an ATA bus controller 120, an ATA bus 122, a data storage device 124, a compact disk read only memory (CD ROM) device 126, a video graphics array (VGA) device 130, a display device 131, a network interface controller (NIC) 140, a wireless local area network (WLAN) controller 150, one or more serial buses 160, a non-volatile rand access memory (NVRAM) 170 for storing a basic input/output system (BIOS) 172, a trusted platform module (TPM) 180, an embedded controller (EC) 190, a time of flight (TOF) proximity sensor 192, a vision system 194, and a low power (LP) camera 196.

TOF sensor 192 can be used to identify the presence of a user proximate to information handling system 100. A TOF sensor typically includes an infra-red light source such as a light emitting diode to provide illumination, a photoelectric detector, and a timing circuit to calculate the time it takes for light to travel from the light source to an object, and back to the detector. The photoelectric detector can include a single sensor element or an array of elements similar to sensors used in digital cameras. Alternatively, TOF sensor 192 can operate using radio waves, similar to radar systems. TOF sensor 192 can be installed at information handling system 100, for example incorporated at a display device. During operation, TOF sensor 192 can determine the distance between a user and the TOF sensor.

LP camera 196 typically captures a low resolution image relative to a high definition (HD) camera that may be included at information handling system 100 (HD camera not shown at FIG. 1). For example, LP camera 196 may provide images having 320×240 pixels (QVGA) or another resolution. LP camera 196 may be capable of detecting infrared light, and may be coupled to an infrared light source to provide illumination of objects in the vicinity of LP camera 196. LP camera1 196 typically consumes a small fraction of the power required to operate an HD camera, for example a few mW or lower. Accordingly, LP camera 196 may be referred to as an always-on camera sensor (AoS), capable of operating even when information handling system in a sleep state.

Vision system 194 is configured to analyze an image provided by LP camera 196 to identify a gaze direction of a user operating information handling system 100. Vision system 194 may utilize machine-learning, similar artificial intelligence technology algorithms, or dedicated logic to identify a position of a user relative to a display device. In addition, vision system 194 may be configured to interpret and distinguish facial characteristics, such as whether a user's gaze it directed towards LP cameral 196, or instead directed away from the camera and the display. To maintain privacy and security, images captured by LP camera 196 can be provided only to vision system 194, thereby being inaccessible to other processes executing at system 100.

NVRAM 170 can be referred to as a serial peripheral interface (SPI) flash storage device, BIOS SPI, and the like. TPM 180 is configured to ensure that the boot process starts from a trusted combination of hardware and software, and continues until the operating system has fully booted and applications are running. TPM 180 is compliant with an international standard for a secure cryptoprocessor, a dedicated microcontroller designed to secure hardware through integrated cryptographic keys. EC 190 can be referred to as a service processor, a baseboard management controller (BMC), and the like. EC 190 includes a processor that can operate out-of-band with respect to CPU 102. For example, remote management systems can utilize EC 190 to access components at information handling system independent of an operating state of CPU 102. EC 190 may be responsible for performing low level hardware tasks including thermal management and power management operations.

BIOS 172 includes instructions executable by CPU 102 to initialize and test the hardware components of system 100, and to load a boot loader or an operating system (OS) from a mass storage device. BIOS 172 additionally provides an abstraction layer for the hardware, i.e. a consistent way for application programs and OS to interact with the keyboard, display, and other input/output devices. When power is first applied to information handling system 100, the system begins a sequence of initialization procedures. During the initialization sequence, also referred to as a boot sequence, components of system 100 are configured and enabled for operation, and device drivers can be installed. Device drivers provide an interface through which other components of the system 100 can communicate with a corresponding device. After the initialization procedure is complete and an operating system, such as Windows, is loaded, computational operation of information handling system can begin. BIOS 172 can be substantially compliant with one or more revisions of the UEFI specification. The UEFI specification provides standard interfaces and interoperability guidelines for devices that together make up an information handling system. The UEFI specification allows for the extension of platform firmware by loading UEFI driver and UEFI application images. For example, an original equipment manufacturer can include customized or proprietary images to provide enhanced control and management of the information handling system 100.

Information handling system 100 can include additional components and additional buses, not shown for clarity. For example, system 100 can include multiple processor cores, audio devices, and the like. While a particular arrangement of bus technologies and interconnections is illustrated for the purpose of example, one of skill will appreciate that the techniques disclosed herein are applicable to other system architectures. System 100 can include multiple CPUs and one ore more components can be integrated together. For example, portions of chipset 106 can be integrated within CPU 102. In an embodiment, chipset 106 can include a platform controller hub (PCH). System 100 can include additional buses and bus protocols. Serial bus 160 is representative of one or more buses and/or bus protocols, such as a serial peripheral interface (SPI) bus, an inter-integrated circuit protocol (I2C) bus, a system management bus (SMB), a power management bus (PMBus), and the like. Additional components of information handling system 100 can include one or more storage devices that can store machine-executable code, one or more communications ports for communicating with external devices, and various input and output (I/O) devices, such as a keyboard, a mouse, and a video display.

For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as CPU 102, a programmable logic array (PLA), an embedded device such as a System-on-a-Chip (SoC), or other control logic hardware. Information handling system 100 can also include one or more computer-readable medium for storing machine-executable code, such as software or data.

Figure 2:
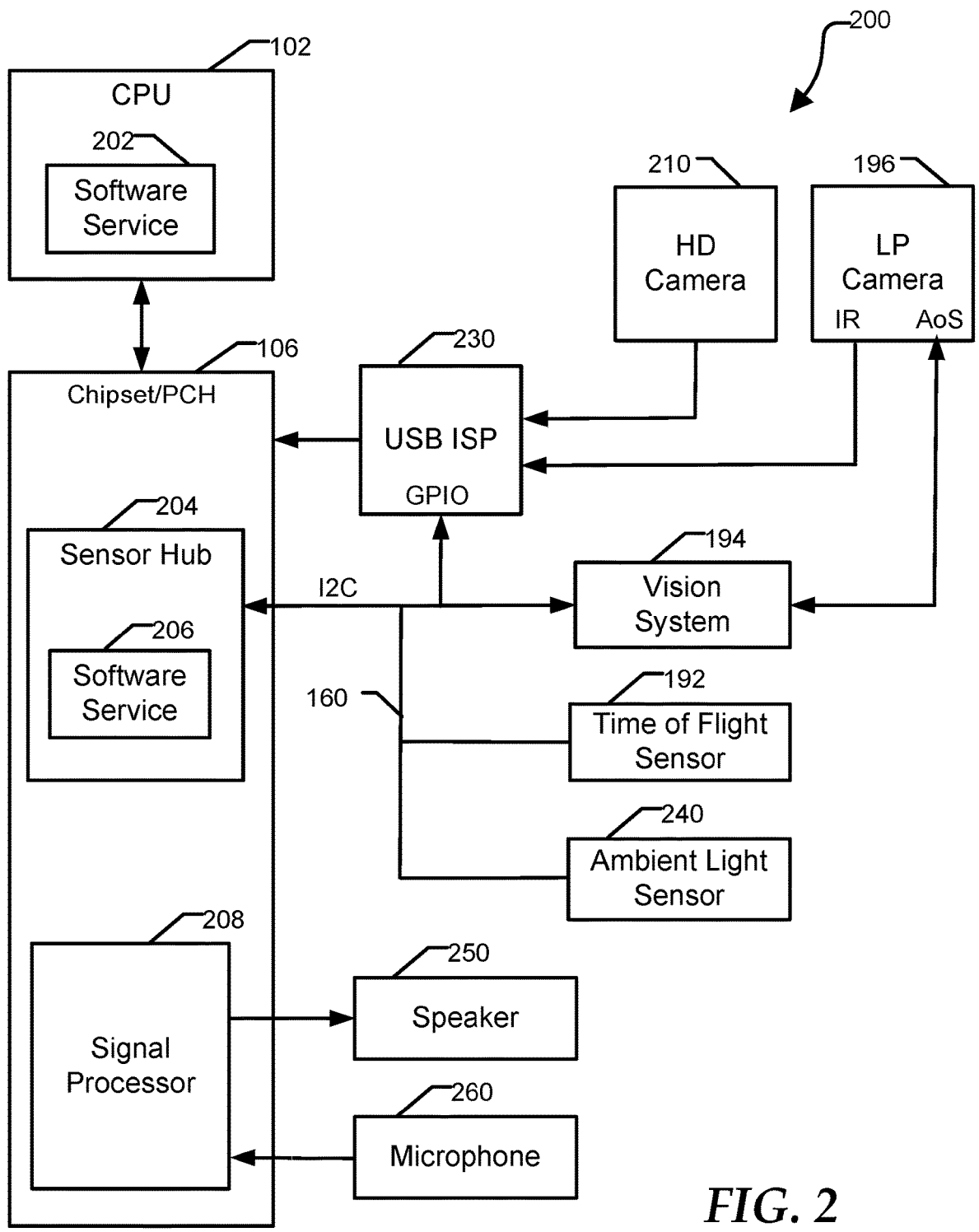
FIG. 2 is a block diagram illustrating a sensor integration system according to a specific embodiment of the present disclosure.

FIG. 2 shows a sensor integration system 200 according to a specific embodiment of the present disclosure. System 200 includes CPU 102, chipset 106, HD camera 210, LP camera 196, a USB image signal processor (ISP) 230, vision system 194, TOF sensor 192, an ambient light sensor (ALS) 240, speaker 250, and microphone 260. CPU 102 is configured to execute a sensor integration software service 202. Chipset 106 includes a sensor hub 204 and a signal processor 208. Sensor hub 204 includes a microcontroller (not shown at FIG. 2) that is configured to execute a sensor integration software service 206. USB ISP 230 is configured to process images received from HD camera 210 and optionally IR images received from LP camera 196, and provide video to chipset 106 via a USB interface. Vision system 194 is configured to receive an image from LP camera 196, analyze the image, and provide information identifying a user's position and gaze direction to sensor hub 204 via I2C bus 160. Vision system 194 is also coupled to a GPIO register at USB ISP 230 to identify when vision system 194 is utilizing LP camera 196. TOF sensor 192 and ALS sensor 240 are also coupled to sensor hub 204 via I2C bus 160. ALS sensor 240 can be used to detect the presence of a user proximate to information handling system 100. Integration software service 202 is configured to execute at CPU 102 during runtime while information handling system 100 is under the control of an operating system. Sensor integration software service 206 can execute at sensor hub 204 independent of the operating/sleep state of system 100.

Speaker 250 may represent any type of audio playback transducer, such as a loudspeaker, headphones, ear buds, and the like. System 200 can include a single monophonic audio output device, a pair of devices to provide a stereo image, or additional devices to provide surround-sound effects. Microphone 260 is any audio transducer capable of converting sound waves into electrical signals and may include a microelectromechanical system (MEMS) device or another type of audio capturing device. System 200 can include a single microphone, a stereo pair of microphones, or and array of microphones. Speaker 250 and microphone 260 can be incorporated at a display device associated with information handling system 100, or may include discreet devices proximate to system 100. Signal processor 208 is configured to modify properties of audio signals provided to speaker 250 and/or received from microphone 260, as directed by software service 202 or software service 206. In particular, signal processor 208 can adjust amplitude, phase and spatial delay, frequency content (equalization), dynamic range, compression, expansion, provide noise suppression, and the like, of an audio signal. For example, software service 202 can receive information identifying a position of a user relative to information handling system 100 based on images received from LP camera 196, and configure signal processor 208 to adjust audio properties of signals provided to speaker 250 and/or received from microphone 260 based on the position of the user relative to a display device.

In an embodiment, signal processor 208 can be configured to provide microphone beamforming and speaker beam steering. Microphone beamforming is a signal processing technique where a microphone array can be designed to be more sensitive to sound coming from one or more specific directions than sound coming from other directions. Beamforming can be used to improve the fidelity of signals received from microphones based on the position or gaze direction of a user. Beam steering is a similar technology typically associated with audio playback from two or more speakers, such as a line-array of speakers, where sound pressure can be directed towards specific locations relative to the location of the speakers. Beam steering can be used to improve the fidelity of sound generated by speakers based on the position or gaze direction of a user. Beamforming, beam steering, and other signal processing techniques can be used in a video chat scenario to improve the perceived sound quality for attendees, both listeners and speakers. Software services 202 and 206 can implement and dynamically adjust these techniques in real time as participants move or change their gaze direction during the video chat session.

Figure 3:
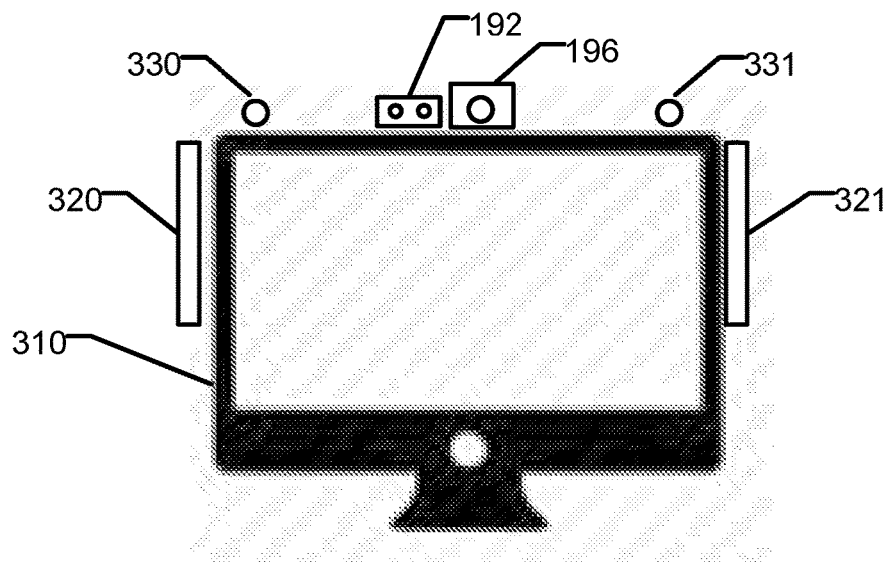
FIG. 3 is a diagram illustrating a display device according to a specific embodiment of the present disclosure.
Figure 4:
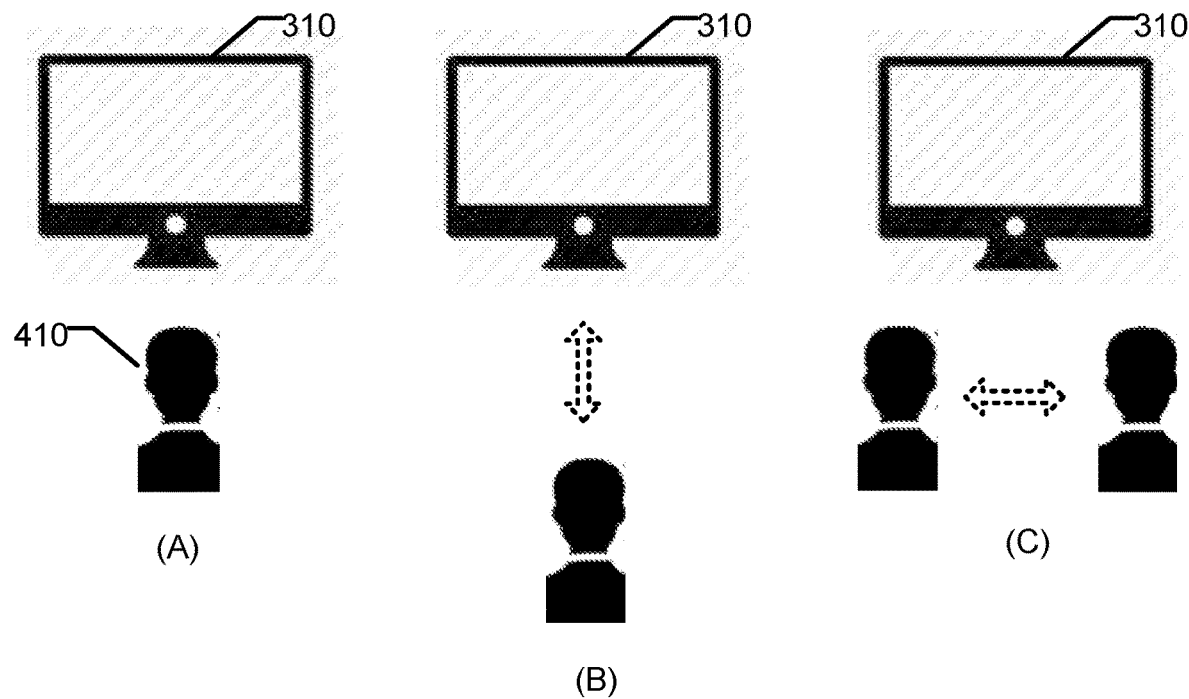
FIG. 4 is a diagram illustrating various positions of a user relative to a display device according to a specific embodiment of the present disclosure.

FIG. 3 shows a display device 310 according to a specific embodiment of the present disclosure. Display device 310 can be a discreet device coupled to information handling system 100 or an integral part of system 100. Display device 310 can include TOF sensor 192, LP camera 196, speakers 320 and 321, and microphones 330 and 331. LP camera 196 is configured to capture images in the general direction of a user operating system 100. FIG. 4 shows a user 410 situated at various positions relative to display 310. For example, diagram (A) shows user 410 positioned close to and directly in front of display device 310, diagram (B) shows user 410 positioned directly in front of display 310 but further away, and diagram (C) shows user 410 positioned to either side of display 310. During operation, software services 202 and/or 206 can determine the position of user 410 based on information provided by TOF sensor 192 and/or the combination of LP camera 196 and vision system 194. In addition, HD camera (not shown at FIG. 3) can be used to perform eye tracking of user 410 with greater precision than that provided by LP camera 196. During operation, the position of user 410 relative to display 310 can be used to adjust audio properties of signals provided to speakers 320 and 321, and to adjust audio properties of signals received at microphones 330 and 331.

Figure 5:
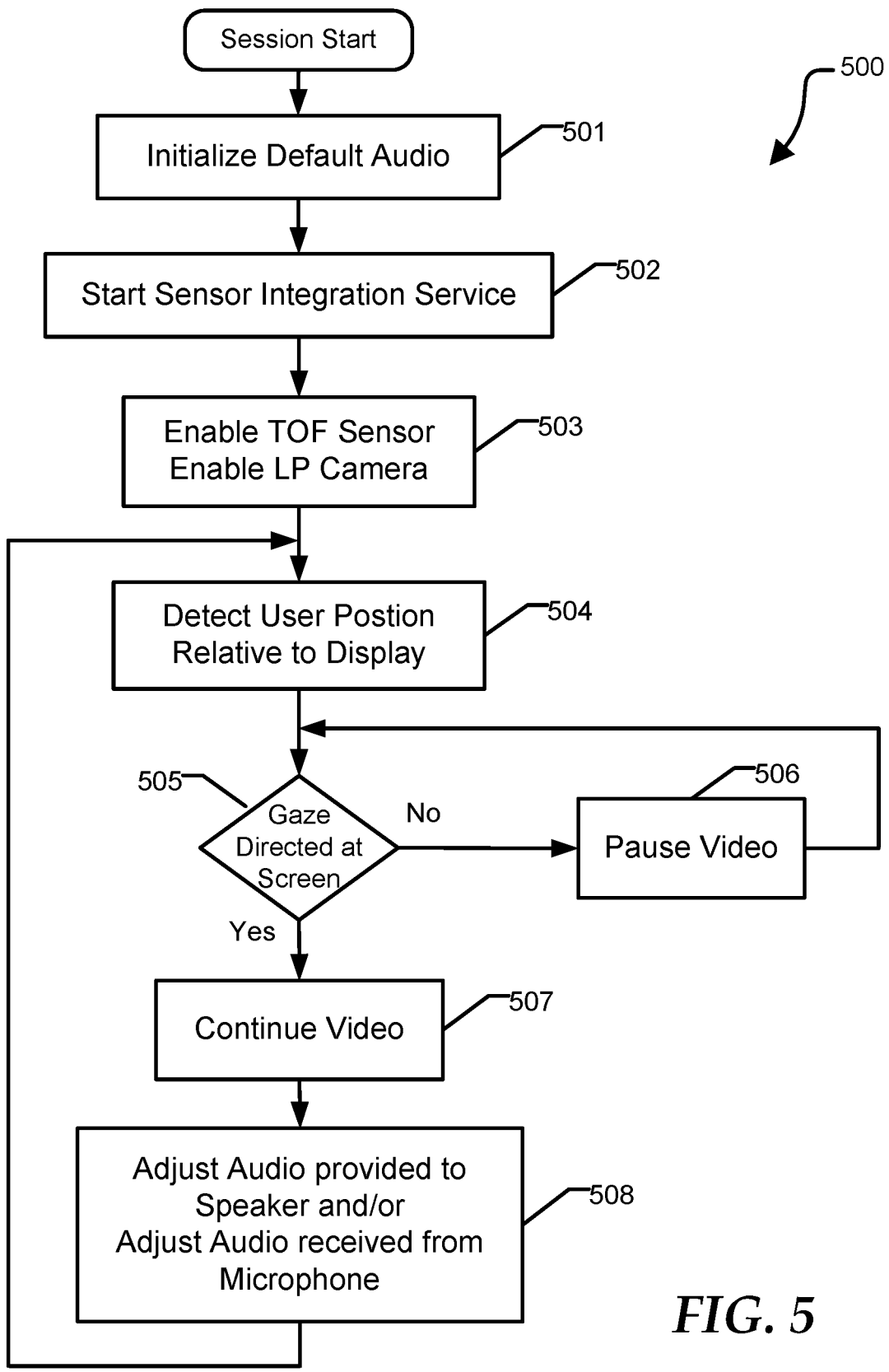
FIG. 5 is a flow diagram illustrating a method for adjusting audio properties based on a position of a user at an information handling system according to a specific embodiment of the present disclosure.

FIG. 5 shows a method 500 for adjusting audio properties based on a position of a user at an information handling system according to a specific embodiment of the present disclosure. Method 500 begins at block 501 where the audio processing system at an information handling system is initialized to a default configuration. For example, signal processor 208 can be configured to provide a balanced stereo image of audio signals being provided to speakers 320 and 321 and of audio signals being recorded at microphones 330 and 331. At block 502, a sensor integration service is initialized. For example, one or both of software services 202 and 206 are processes that can control operations at information handling system 100 based on information provided by sensors coupled to sensor hub 204. The sensors can include LP camera 196 that is coupled to sensor hub 204 via vision system 194, TOF sensor 192, ambient light sensor 240, HD camera 210, and the like. Method 500 continues at block 503 where TOF sensor 192 and LP camera 196 are enabled, as is vision system 194.

Blocks 505, 506, and 507 are optional and represent how the sensor information can further be used to control one or more applications executing at system 100. For the present example, the application is a video presentation application. In particular, decision block 505 illustrates how LP camera 196 together with vision system 194 can identify a gaze direction of a user based on an orientation of the user's head. If the user is not looking at the display device, method 500 continues at block 506 where a video presently being displayed at information handling system 100 can be paused. When the user's attention is once again directed at the display, method 500 proceeds to block 507 where presentation of the video can continue, if previously paused. Method 500 completes at block 508 where properties of audio signals provided to speakers 320 and 321 and audio properties of signals received from microphones 330 and 331 can be adjusted based on the position and/or gaze direction of the user relative to display 310.

As described above, the audio adjustments can be performed by signal processor 208, and may include adjusting volume, frequency response, and the like so as to improve the fidelity of audio signals provided to the user and to listeners, such as other members of a video conference. For example, if the sensor integration software service determines that the user has moved further from the display, and therefore further away from the speakers and microphones, the service can increase the volume of audio being played from speakers 320 and 321 and the volume of audio received at microphones 330 and 331. If the user moves from side to side relative to the display, the software service can modify the relative balance of audio signals provided to speakers 320 and 321 or of audio signals received from microphones 330 and 331, based on a position of the user.

Figure 6:
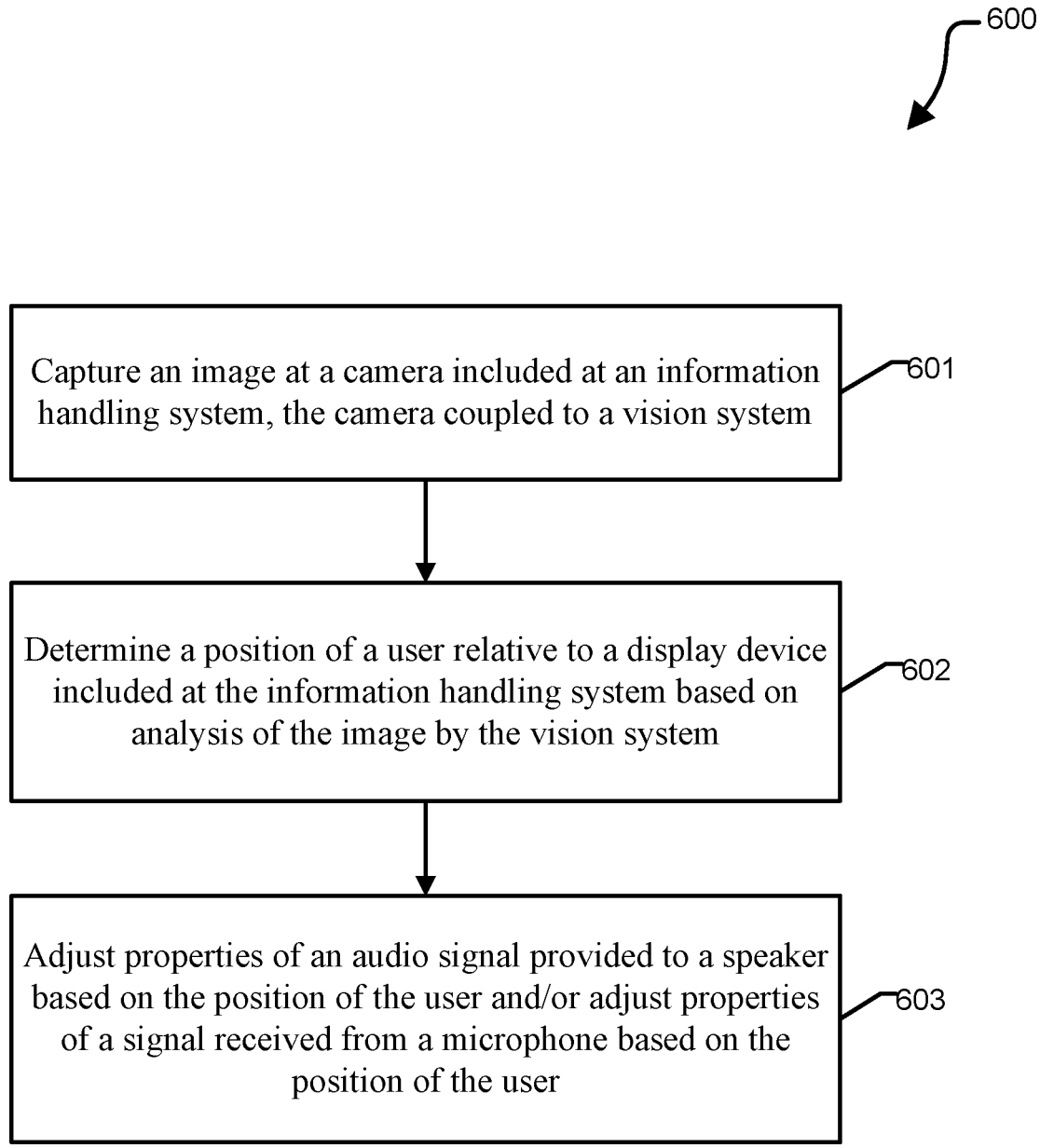
FIG. 6 is a flow diagram illustrating a method for adjusting audio properties based on a position of a user at an information handling system according to another embodiment of the present disclosure.

FIG. 6 is a flow diagram illustrating a method 600 for adjusting audio properties based on a position of a user at an information handling system according to another embodiment of the present disclosure. Method 600 begins at block 601 where an image is captured at a camera included at an information handling system, the camera coupled to a vision system. For example, LP camera 196 can be configured to periodically capture an image. LP camera 196 can be directed perpendicular to the plane of display 310 and can provide a wide enough angle of exposure to include a user located broadly proximate to the display. In addition, TOF sensor 192 can provide information to software services 202 and/or 206 identifying a distance between display 310 and a user. At block 602, a position of a user relative to display device 310 is determined based on analysis of the image by vision system 194. Method 600 completes at block 603 where properties of an audio signal provided to a speaker can be adjusted based on the position of the user and/or properties of a signal received from a microphone can be adjusted based on the position of the user.

The techniques described above are especially suited for a video conference scenario, but are equally useful for when a single user is listening to, or recording, audio. The above techniques are applicable to information handling systems that include more than one display device, multiple LP cameras, multiple TOF sensors; and systems having additional speakers and microphones. For example, properties of audio signals at each speaker and microphone can be independently adjusted based on the position of the user relative to each display device. The type and amount of adjustment can be predetermined, such as specified by information stored at information handling system 100. Alternatively, aspects of the adjustments can be configured based feedback provided by a user. In addition the adjustments can be performed in lieu of, or in coordination with audio controls available to the user. The preceding techniques can be performed while maintaining privacy of the user, since images captured by LP camera 196 can be made unavailable to other applications running at information handling system 100.

Proximity and position sensing described above may further be used to adjust the visual properties of video or other information being displayed at information handling system 100. For example, software services 202 and/or 206 can be configured to adjust the resolution, brightness, contrast, and the like of display 310 based on the position of the user relative to the display. Furthermore, position sensing can be used to adjust image properties at HD camera 210. For example, software service 202 can be configured to identify the position of a user and adjust HD camera 210 to maintain focus on the user. While the above techniques have been described in the context of a personal computer device, one of skill will appreciate that these techniques can be employed by any device having a camera and/or TOF sensor and one or more audio devices.

Referring back to FIG. 1, the information handling system 100 can include a set of instructions that can be executed to cause the information handling system to perform any one or more of the methods or computer based functions disclosed herein. The information handling system 100 may operate as a standalone device or may be connected to other computer systems or peripheral devices, such as by a network.

In a networked deployment, the information handling system 100 may operate in the capacity of a server or as a client user computer in a server-client user network environment, or as a peer computer system in a peer-to-peer (or distributed) network environment. The information handling system 100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single information handling system 100 is illustrated, the term "system" shall also be taken to include any collection of systems or sub-systems that individually or jointly execute a set, or multiple sets, of instructions to perform one or more computer functions.

The information handling system 100 can include a disk drive unit and may include a computer-readable medium, not shown in FIG. 1, in which one or more sets of instructions, such as software, can be embedded. Further, the instructions may embody one or more of the methods or logic as described herein. In a particular embodiment, the instructions may reside completely, or at least partially, within system memory 104 or another memory included at system 100, and/or within the processor 102 during execution by the information handling system 100. The system memory 104 and the processor 102 also may include computer-readable media. A network interface device (not shown at FIG. 1) can provide connectivity to a network, such as a wide area network (WAN), a local area network (LAN), or other network.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions or receives and executes instructions responsive to a propagated signal; so that a device connected to a network can communicate voice, video or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories.

Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
a display device;
a first speaker;
a time of flight proximity sensor including an infrared light source to provide an infrared light, the time of flight proximity sensor to:
  determine a distance from the display device to the user based on the infrared light source; and
  provide information including the distance, wherein the information is based on the infrared light source;
a low power camera to capture an infrared light image based on the infrared light provided from the infrared light source, wherein the low power camera operates when the information handling system is in a sleep state;
a vision system coupled to the low power camera, the vision system to determine a gaze direction of a user based on the infrared light image from the low power camera;
a sensor hub coupled to the vison system and to the time of flight sensor;
a software service to:
  receive the infrared light image from the low power camera;
  receive the information from the time of flight proximity sensor;
  determine a position of the user relative to the display device based on analysis of the infrared light image by the vision system and based on the distance from the time of flight proximity sensor;
  determine a movement in the gaze direction of the user;
  adjust properties of a first audio signal provided to the first speaker based on the position of the user;
  detect movement of the user from being positioned in front of a first side of the display device to being positioned in front of a second side of the display device based on the information from the time of flight proximity sensor; and
  adjust properties of the first audio signal based on the information, wherein the adjustment of the properties of the first audio signal includes the software service to modify a relative balance of the first audio signal based on the detected movement of the user from being positioned in front of the first side of the display device to being positioned in front of the second side of the display device and based on the determined movement in the gaze direction of the user.

2. The information handling system of claim 1, wherein the software service is further to adjust properties of the first audio signal based on the distance.

3. The information handling system of claim 1, further comprising:
a first microphone,
wherein the software service is further to adjust properties of a second audio signal received from the first microphone based on the position of the user.

4. The information handling system of claim 3, further comprising determine the position of the user relative to the display device further based on the second audio signal and a third audio signal received from a second microphone.

5. The information handling system of claim 1, wherein the adjusting comprises modifying amplitude of the first audio signal.

6. The information handling system of claim 1, wherein the adjusting comprises modifying phase of the first audio signal.

7. The information handling system of claim 1, wherein the adjusting comprises modifying frequency content of the first audio signal.

8. The information handling system of claim 1, further comprising a second speaker receiving a second audio signal, wherein the adjusting comprises adjusting the first audio signal and adjusting the second audio signal to implement beam steering to direct sound towards the user based on the position of the user.

9. The information handling system of claim 1, wherein in response to determining, by the vision system, that the gaze direction of the user is not directed at the display device, the software service is further to pause display of a video at the display device.

10. The information handling system of claim 1, wherein the software service is further to adjust properties of a second audio signal provided to a second speaker based on the position of the user, the adjustment of the second audio signal different than the adjustment of the first audio signal.

11. An information handling system comprising:
a display device;
a first microphone;
a time of flight proximity sensor including an infrared light source to provide an infrared light, the time of flight proximity sensor to:
  determine a distance from the display device to the user based on the infrared light source; and
  provide information including the distance, wherein the information is based on the infrared light source;
a low power camera to capture an infrared image based on the infrared light provided from the infrared light source, wherein the low power camera operates when the information handling system is in a sleep state;
a vision system coupled to the low power camera, the vision system to determine a gaze direction of a user based on the infrared light image from the low power camera;
a sensor hub coupled to the vison system and to the time of flight sensor;
a software service to:
  receive the infrared light image from the low power camera;
  receive the information from the time of flight proximity sensor;

determine a position of the user relative to the display device based on based on analysis of the infrared light image by the vision system and based on the distance from the time of flight proximity sensor;

determine a movement in the gaze direction of the user; and adjust properties of a first audio signal received from the first microphone based on the position of the user;

detect movement of the user from being positioned in front of a first side of the display device to being positioned in front of a second side of the display device based on the information from the time of flight proximity sensor; and adjust properties of the first audio signal based on the information, wherein the adjustment of the properties of the first audio signal includes the software service to modify a relative balance of the first audio signal based on the detected movement of the user being positioned in front of the first side of the display device to being positioned in front of the second side of the display device and based on the determined movement in the gaze direction of the user.

12. The information handling system of claim 11, further comprising:

a first speaker, wherein the software service is further to adjust properties of a second audio signal provided to the first speaker based on the position of the user.

13. The information handling system of claim 11, wherein the adjusting comprises modifying amplitude of the first audio signal.

14. The information handling system of claim 11, wherein the software service is further to adjust properties of a second audio signal received from a second microphone based on the position of the user, the adjustment of the second audio signal different than the adjustment of the first audio signal.

15. A method comprising:

providing, by an infrared light source in a time of flight proximity sensor of an information handling system, an infrared light;

determining, by the time of flight proximity sensor, a distance from the display device to the user based on the infrared light source; and providing information including the distance, wherein the information is based on the infrared light source;

capturing, based on the infrared light provided from the infrared light source, an infrared image at a low power camera include at the information handling system, wherein the low power camera operates when the information handing system is in a sleep state;

receiving the infrared light image from the low power camera;

determining, by a vision system, a gaze direction of a user based on the infrared light image from the low power camera;

receiving the infrared light image from the low power camera;

receiving the information from the time of flight proximity sensor;

determining a position of the user relative to a display device included at the information handling system based on analysis of the infrared image by the vision system;

determining a movement in the gaze direction of the user;

adjusting properties of a first audio signal provided to a speaker based on the position of the user;

detecting, by the software service, movement of the user from side to side relative to the display device based on the information from the time of flight proximity sensor; and adjusting properties of the first audio signal based on the information, wherein the adjustment of the properties of the first audio signal includes modifying a relative balance of the first audio signal based on the detected movement of the user from being positioned in front of a first side of the display device to being positioned in front of a second side of relative to the display device and based on the determined movement in the gaze direction of the user.

16. The method of claim 15, further comprising adjusting properties of a second audio signal received from a first microphone included at the information handling system, the adjusting based on the position of the user.

17. The method of claim 15, further comprising adjusting properties of a second audio signal provided to a second speaker based on the position of the user, the adjustment of the second audio signal different than the adjustment of the first audio signal.

* * * * *